United States Patent
Schmidtlein et al.

[11] 3,992,707
[45] Nov. 16, 1976

[54] REPRODUCTION OF A FIELD OF VIEW AS SCANNED BY A REMOTE CONTROLLED AIRCRAFT

[75] Inventors: Hubertus Schmidtlein, Brinkum; Joachim Berger, Bremen, both of Germany

[73] Assignee: Vereinigte Flugtechnische Werke-Fokker GmbH, Bremen, Germany

[22] Filed: Sept. 13, 1974

[21] Appl. No.: 505,732

[52] U.S. Cl. .......................... 343/5 CM; 343/5 SC; 343/6 A; 343/6 ND
[51] Int. Cl.[2] ........................................... G01S 9/02
[58] Field of Search .......... 343/5 CM, 5 MM, 5 SC, 343/6 A, 6 ND

[56] References Cited
UNITED STATES PATENTS

| | | | |
|---|---|---|---|
| 2,845,620 | 7/1958 | Hammond, Jr. et al. | 343/5 CM X |
| 2,874,378 | 2/1959 | Jacobsen | 343/6 A |
| 3,076,961 | 2/1963 | Bibbero | 343/6 ND |
| 3,163,098 | 12/1964 | Kierstead | 343/5 MM X |
| 3,201,787 | 8/1965 | Grewe et al. | 343/6 A |
| 3,624,650 | 11/1971 | Paine | 343/5 CM X |
| 3,653,044 | 3/1972 | Breeze et al. | 343/5 SC |
| 3,742,495 | 6/1973 | Diamantides | 343/5 MM |
| 3,745,570 | 7/1973 | Voles | 343/6 A X |
| 3,810,174 | 5/1974 | Heard et al. | 343/5 SC X |

*Primary Examiner*—T.H. Tubbesing
*Attorney, Agent, or Firm*—Ralf H. Siegemund

[57] ABSTRACT

The field-of-view is line-scanned transverse to movement of a vehicle such as an aircraft and the line scan signal is transmitted to a ground station in which a frame is assembled on a line for line basis with updating by each new scanning line to obtain a running picture to be displayed and imaging passage of the vehicle over the field-of-view. Additional information may be juxtaposed and superimposed. The scanning-display path may be part of a loop linked through an operator observing the display and manipulating remote control for the vehicle.

17 Claims, 6 Drawing Figures

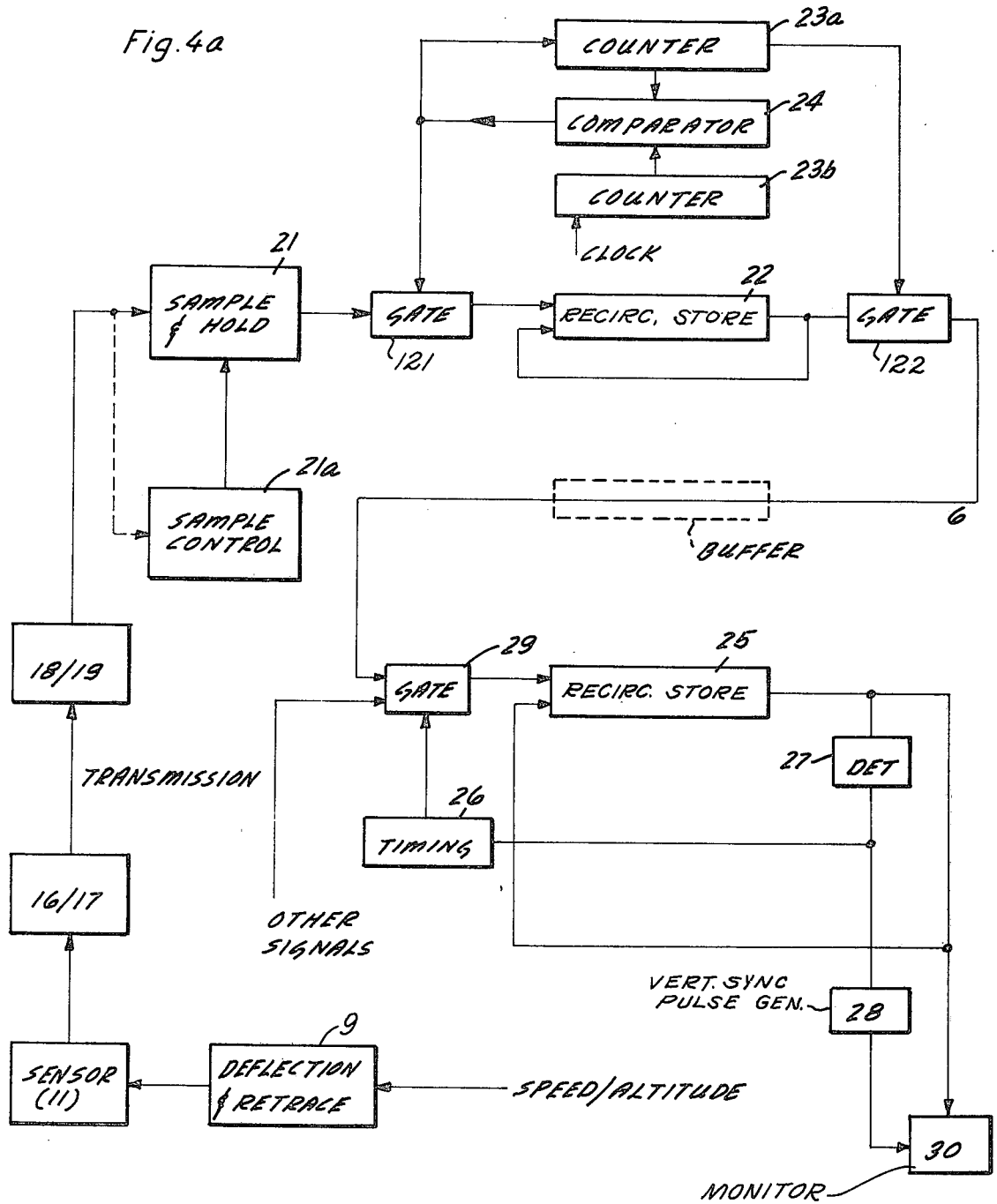

REPRODUCTION OF A FIELD OF VIEW AS SCANNED BY A REMOTE CONTROLLED AIRCRAFT

BACKGROUND OF THE INVENTION

The present invention relates to the reproduction of images produced through video pickup by means of sensors on a remote controlled craft, the reproduction to take place in a control stand from which the craft is controlled.

The remote control of vehicles proceeds usually as follows. Signal representation of a field-of-view from the vehicle is produced and transmitted to a stationary (or independently mobile) control stand, and an image of that field-of-view is reproduced to guide the operator in his remote control of the vehicle. Of course a complete TV like system on a closed circuit basis with a camera in the vehicle and a monitor in the control stand is the obvious way of handling remote monitoring of a field-of-view. Another approach, however, has been to scan the passing scenery in strips by means of infrared scanners, TV type video scanners or radar, and appropriate signals are transmitted to a station in which images are reproduced and composed from the scanning signals. This type of line or strip scanning has the advantage of simplicity over complete image transmission, however it has rarely been practiced because image reproduction is quite complicated here. The image information cannot be just reproduced in a regular TV monitor because scanning lines are missing as such and have to be generated first in the receiving station.

SUMMARY OF THE INVENTION

It is an object of the present invention to provide for a new and improved image reproduction of information picked up by a remote controlled vehicle and covering a particular field-of-view.

It is a specific object of the present invention to provide for the reproduction of stripwise produced image signals representing field-of-view information taken from a remote controlled vehicle such as an aircraft or the like.

If we speak here of a field-of-view, this is not to mean that the picked up information has to be visible radiation. Rather a limited area is meant thereby which reflects radiation that can be picked up. This then may include visible radiation, but also infrared or radiation having longer wavelength such as resulting from a radar echo.

In accordance with the preferred embodiment of the invention it is suggested to provide a line scan of the area regarded as particular field-of-view but with field scanning resulting from the propagation of the vehicle transversely to the lines of the scan. The line scan signal is stored on a line for line basis, and image display is composed from these lines to obtain a running image of the field-of-view, changing as the vehicle progresses. New lines as produced are added to the top of the displayed image, the others are shifted down, and bottom lines are sequentially deleted as the vehicle progresses. Thus, the field scan of this display is indirectly produced by the progression of the aircraft.

Preferably, one scans at a slightly forwardly oriented angle, so that the location of the vehicle relative to the image as reproduced is situated somewhat below the top line and the scenery ahead of as well as behind the vehicle may appear in the same picture. It may be advantageous to superimpose in the display a symbol, mark or the like representing the vehicle. Additional information may be superimposed or juxtaposed to the display, such as pictorial information of the area over which the vehicle travels. Also, identifying marks may be superimposed.

The vehicle may be equipped with different sensors which e.g. operate qualitative differently (on different wavelengths) covering the same area, or the different sensors cover different fields-of-view. In either case, muliple signal trains will be produced to be reproduced separately or in superimposed relation (e.g. multi colored display).

The storage facility for the scanning line should have a capacity at last equal to the number of lines per reproduction frame. In the general sense storage may include recording for obtaining a permanent record for later evaluation if that is desired.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4a is a schematic system diagram for the storage of the information;

Figure 2:
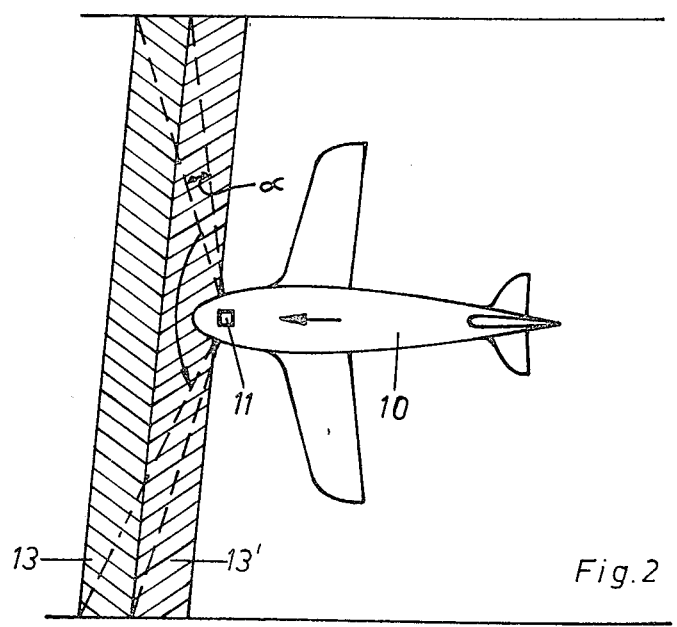
FIG. 2 is a top view of the craft as shown in FIG. 1.

Proceeding now to the detailed description of the drawings, a remote controlled i.e. unmanned aircraft 10 passes over a particular area. The aircraft is equipped with a sensor 11 which scans the area underneath and slightly ahead of the aircraft and in successive strips 13', 13 etc. The area bounded by the two horizontal lines above and below the aircraft 10 in FIG. 2 can be termed a particular field-of-view. That area or field-of-view is scanned by means of line scanner 11 whereby the aircraft as it moves forward establishes the field scan transverse to the lines of the scan.

Reference numeral 12 refers to an additional or alternative sensor, likewise providing stripwise scanning but specifically for the area directly underneath the craft (and to the right and left of that specific area).

The specific sensor employed may be a TV camera type scanner, an infrared scanner or a radar scanner, or other types of scanner. However, it should be noted that the aircraft may have multiple scanners all combined in one unit and all scanning individually and, possibly, in synchronism along the same strip, resulting in multiple scanning signals which are produced in parallel and represent in each instant in image increment from the same areal increment but differing in that the respective carrier wave for the resulting contrast (amplitude modulation) was different. The carrier, of course, is the respective radiation wave used, infrared, red, blue etc., or longer waves (microwaves) as used in radar.

The width of the strip as scanned is determined by focussing the respective probing beam (if any) and/or by focussing the reception. That width must be determined in relation to the speed of the craft so that scanning of one strip takes the same time the craft tranverses the width of the strip on the ground. Of course, one has to consider that the line width adjustment in that manner is limited by the resolution of the system and it may be necessary to change the rate and line frequency of scanning accordingly.

If one assumes that the altitude of the craft remains constant and if the aperture angle $\alpha$ of the sensor is a given, constant parameter, then the scanning rate should be made to vary proportional to the aircraft speed. For still the same sensor angle $\alpha$, the scanning rate should vary inversely with altitude, or one can say that the scanning rate should vary proportional to the speed/altitude ratio of the craft, always assuming the same viewing angle of the field of the view as covered by the scanner, covering the same angular range regardless of altitude.

The line-type strip scanning is known as such and does not require elaboration. Moreover, it is convenient at first to explain the invention on the basis of a single sensor, single signal train and single transmission channel. It is apparent, that as a result of the strip scanning, a linear signal is produced which represents the area scanned in sequential strips, each strip separated from the next one by retrace. It can be seen from FIG. 2 that the strips are oriented slightly oblique to the axis of the plane and the direction of flight. Accordingly, the scanning is carried out exactly at 90° to that direction and axis, as the latter movement along represents the field or frame scan.

Figure 3:
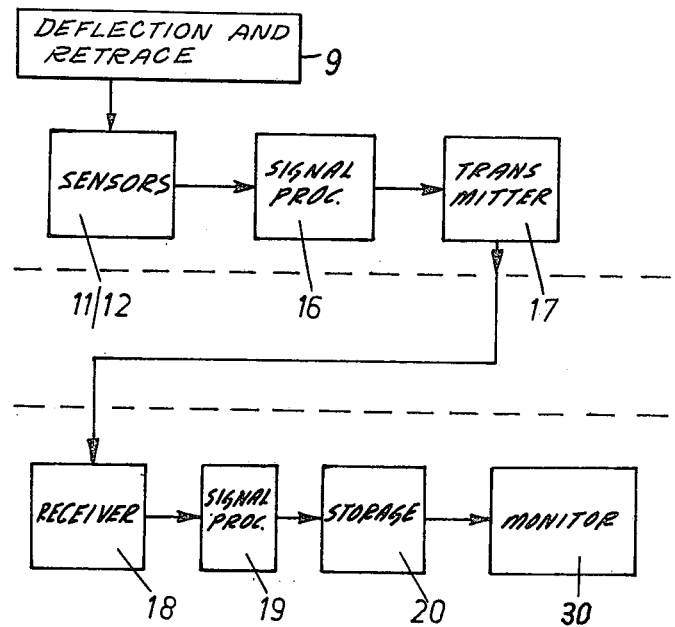
FIG. 3 is a block diagram for illustrating the flow of information.

For a summary description of the system reference is made to FIG. 3. The sensor 11/12 are under control of a deflector and retrace circuit 9 to provide for the line scanning. Field scanning results from the propagation of the aircraft. Sensor 11 or 12 feeds a signal train to a station 16 inside of the aircraft which processes the signal train prior to transmission. Processing includes amplification of the signal; filtering to remove unwanted components and some of the disturbances; signal limiting for reasons of range adjustment; and noise elimination. These are conventional ways of preparing a picked up sensor and detector signal for further processing. As will be explained more fully below, the signal may be subject to time scale expansion, storage and selection.

The resulting output signal passes as a modulator signal to a transmitter 17 in which the signal is FM or AM modulated, for transmission to a ground station. The major system components above the upper dotted line in FIG. 3 pertain to the aircraft, the components below the lower dotted line are in the ground station. Accordingly, the line between transmitter 17 and a ground receiver denotes generally the transmission link.

It should be noted however, that the term ground station is used here only for purposes of distinction from the vehicle (e.g. the aircarft). Decisive is that the "ground station" does not move with the remote controlled vehicle. That station may indeed be on the ground but it may also be in a vehicle moving independently from the remote controlled vehicle that contains scanner 11.

For all practical purposes the transmission link is a wireless one, though that is not essential in principle as far as the invention is concerned. If the vehicle is a land or a water vehicle the transmission may occur via cable. The transmitter 17 will include cable drives accordingly in that case.

The receiver 18 provides the signal to a signal processing stage 19. Processing in stage 19 may also include amplification, filtering limiting, noise suppression etc. Moreover, stage 19 may include demodulation of the incoming signal as received.

The signals as leaving stage 19 are passed to a buffer system 20 which receives the information on a scanning line-by-line basis, stores them and provides the signals to a reproducing monitor 30 as demanded and in such a format to be suitable for the production of a running, two dimensional image. In lieu of or in addition to a monitor 30 one could use here a general storage facility (i.e. a tape unit or the like) to obtain storage of the video information for subsequent utilization and evaluation, for example by means of a computer.

The capacity of buffer system 20 is predetermined on the basis of the number of image lines per frame in monitor 30, that is to say, buffer 20 must be capable of storing at least that many scanning lines. As a new line is set into buffer 20, the one which is held therein the longest is erased or suppressed.

The storage unit or buffer 20 may be a core memory type unit, a disk or a tape unit or a storage tube. In the latter case, one can provide for structural unity of buffer 20 and monitor 30. The storage unit and buffer system 20 must also compensate for a difference between the (aircraft speed dependant) scanning rate of the sensor line scan and the rate of reproduction in the monitor. Each complete scanning line signal as derived from the sensor represents a new line to be inserted as top line in the display. One can therefore, expect that sensor lines are produced at a rate of one line per display frame or less. More about this aspect will be discussed below.

While the invention will explained with reference to a TV type monitor for image display other optical viewers, printers or the like could be used and are within the purview of this invention.

An example for the storage facility 20 is disclosed in FIG. 4a. It is assumed at first for the sake of simplicity (modifications will be discussed later) that a single strip is scanned by the aircraft during one frame time of TV reproduction. A second simplifying assumption is that each scanning line has about as many resolution elements as there are lines in the frame. This simplifying assumption can also be dropped as will be shown shortly.

The preprocessed video signal (or radar signal or signal representing a infrared scan) as derivable from circuit 19 is fed to a sample-and-hold circuit 21 operating e.g. in response to pulses derived from and being in synchronism with the horizontal TV scan sync signals, and feeding the sampled signals to an accumulating store 22 such as a rotating disk, endless magnetic tape belt or the like, rotating in synchronism (i.e. circulating its information content) with the TV line signal frequency, one revolution per line.

The single data track used here is deemed divided (e.g. by a prerecorded, parallel clock track) into as many resolution elements (N) as a line is to consist of, and a counter 23a keeps track of how many image increments have been accumulated and placed on the track. The counter is incremented with each element added to the store 22. A counter 23b keeps track of the passing of the sequential storage locations of image increments and recycles when having counted up to N. Agreement of the state of counters 23a and 23b is monitored by a comparator 24 and upon response counter 23a is incremented and the sampled and held value from 21 is gated through gate 121 into the store 22 and stored e.g. recorded therein in proper phase relation to the content already accumulated in the store, as the respective last image increment.

It can thus be seen that accumulating store 22 builds up stepwise the image increments for one line at the rate of presentation so that after one frame period which is equal to one line scan run of the sensor 11, one line has been completely accumulated in fast circulating store 22. As stated, the information circulates in this recirculating store 22 precisely at the line rate of TV reproduction. The rather slow sensor scan is, therefor, translated into a fast rate of representation of information, commensurate with TV reproduction.

The modifications and abandonment of simplifying assumption will be discussed next. If the number of image increments per sensor scanning line is, for example, twice as large as assumed, two samples are taken per TV reproduction line period by device 21. In other words the sample control provides for a multiply-by-two of the TV line sync frequency and samples accordingly. The two samples are stored individually in prestages and placed one after the other in immediate sequence onto store surface 22 and at the rate of the clock as derived from the clock track on that storage surface.

It can thus be seen that the sampling rate does not have to be tied to the TV line frequency as prebuffering readily permits the assembly of the sampled information in the buffer 22 in which the presentation of information is synchronized with the subsequent line by line reproduction process for and in the monitor. The sampling rate must, however, by synchronized with the scanning process by scanner 11 in that the number of sampled increments per scanning line must be the same number N of image increments to be stored as information for one line in store 22. That number is given by the number N of clock pulses on store 22 which is also the number at which counters 23a and 23b recycle.

Therefor, the sample control 21a for sample and hold 21 may extract the sync portion from the input signal for sample and hold 21 (which is the line scan signal from the sensor after transmission) and provide for frequency multiplication e.g. in a phase lock loop by the said number N. That frequency may vary with aircraft speed as stated so that the sample rate varies. Prebuffering of individual image signal increments must be provided for in sufficient number, to permit sequential insertion in the signal track of store 22 when the proper phase has been detected by count number comparator 24.

The video information to be displayed is stored also in a recirculating store such as a disk 25 rotating at TV reproduction frame rate (e.g. one revolution per frame) and having a circular data track, and one track for placing e.g. markers identifying beginning and end of the vertical sync signal period. It should be noted that the line marking recirculating in store 25 as well as in store 22 is symbolic only if the store is a rotating or endless belt like device. Insertion of information is controlled through timing recording, while information extraction is carried and through appropriately positioned read heads.

Whenever the image increment accumulating store 22 has accumulated image increment signals for a complete TV reproduction line, counter 23a (tracking the number of accumulated image increments) so signals and opens a gate 122 for transfer of the line to frame assembly buffer store 25.

It can be seen that the relationship between the line scan by scanner 11 (which is of course equal to the time it takes to build up a line signal in buffer and store 22) and the frame rate comes into play. If that period of time is equal to one frame period, then the content of buffer 22 can be shifted always into buffer 25 as the first line of the new frame. This was a simplifying assumption and will be dropped later.

A timing unit 25 responds to the end marker for the vertical sync (appearing e.g. one line before the end proper) to control the transfer of the content of buffer 22 as the first image line via a gate 29. Detector 27 responds to these sync track markers. Additionally, the beginning of the vertical sync will be recorded one line ahead of the previous ones (the record head may be displaced from the read head of the sync marker track to permit this precession in time as far as the phase of recording of that marker is concerned). Thus, the end-of-sync marker is preseet as to its phase so that all line signals appear to be recorded one line down as before. The beginning-of-the vertical sync signal marker is likewise newly recorded, one line ahead of the previous one thereby eradicating the previous last line of the frame and dumping it from the store. A circuit 28 responds to the detected sync track markers to generate therefrom the vertical sync for the TV reproduction in monitor 30. Whether or not the horizontal sync signals are reproduced also from the store 25 is optional.

It can thus be seen, that each new scanning line becomes the top line of the next frame as it is being reproduced for display while the last line is being dropped. The resetting of the phase of the vertical sync pulse amounts to a precession for all other lines which are shifted down by one line. As a consequence a rolling or progressing picture is produced, progressing as the sensor line scan and the plane progresses.

The vertical sync signal may be fed as retrace control signal to scanner 11 which requires transmission to the aircraft accordingly. This, however, is necessitated only if one in fact assumes line scan-frame reproduction synchronism. No such transmission is needed if that requirement can be dropped as will be explained next.

If the line scan by sensor 11 is completely asynchronous with the frame rate and TV image reproduction as represented by the vertical sync pulse rate, one still should distinguish between two cases. Assuming the aircraft scanner 11 produces more than one line per TV frame (fast image progression) one simply needs additional buffers between line assembly buffer 22 and store 25 for holding the line scan signals until they can be inserted in store 25. One needs to keep track here of the number of such lines held in readiness until they can be inserted, and the frame must precess by that number of lines accordingly. It can be seen however, that in such a case the image will roll quite fast, too fast actually and the scene as imaged will move too fast for the viewer to follow. If the frame rate is 30 frames per second, then the image will shift by 60 lines per frame if two lines are provided anew for each frame. That is already too fast for any meaningful observation. One new line per frame as previously assumed is already quite fast for the usual TV reproduction. Thus, the second case of less than one new sensor scanning line per TV reproduction frame is the more likely situation.

Assuming, therefor, that the scanning of one line by the aircraft scanner 11 takes longer than one TV reproduction frame period, one needs one additional buffer between buffer stores 22 and 25 to hold the content of one line between completion of assembly in buffer 22 and the proper time of insertion into buffer 25 as the new top line in the picture to be reproduced. This additional buffer is indicated in dotted lines. It will operate in TV line synchronism.

In these cases, no line between the scanning rate and retrace control 9 for sensor 11 and the vertical sync generation in monitor 30 is needed. However, the sample rate in circuit 21 must remain in particular relation to the scanning rate of sensor 11. This was already outlined above in that the signal as transmitted will include a sync signal representing the phase of retrace of the sensor 11 operation. That sync signal will be stripped and frequency multiplied by the number N of image increments and elements per line (i.e. number N of clock pulses in the clock track of store 22), and pulses so derived will serve as simple and hold pulses for circuit 21.

Assuming asynchronous relation between frame rate and scanning rate at the aircraft it is advisable to control the sensor deflection rate and retrace, i.e. the line scan frequency of the sensor in dependance upon the speed of the aircraft (input to block 9 in FIG. 4a). This is important if the speed varies significantly. It will be recalled that the advance of the aircraft serves as the field scan. Proportioning the speed of the line scan to the aircraft speed maintains a fixed relation here otherwise the lines could overlap or have gaps between them a far as information pickup is concerned. If the scanning rate were invariable with speed the reproduction would appear as vertical image expansion or contraction as the aircraft speed varies. This may not be detrimental for small speed variations of the aircraft. For large variations, however, proportionality between the line scanning rate by the sensor and the aircraft speed should be provided for. Hence, the aircraft speed should control the deflection rate of the sensor between fixed positions which automatically adjusts the line rate frequency accordingly.

Additionally, the altitude changes the relative speed of the field-of-view as spot wise sensed, and if that viewing angle α of the sensor remains constant, then altitude should enter into the control in inverse relation, i.e. the scanning rate of the sensor 11 (in between fixed positions) should be controlled proportional to speed over altitude. Both parameters are usually present in the aircraft as measuring signals, if the craft is tracked only from ground, speed and altitude representing signals have to be transmitted to the aircraft.

It can readily be seen that the bend of transmitted signals is or can be of relatively low frequency because the scanning by the sensor is carried out at relatively low frequency. In the preferred example the line frequency of scanning is smaller than the frame rate of TV reproduction. Lower frequency transmission and a low frequency band was found to be advantageous for reasons of noise suppression.

As a modification of the slow sensor scan one can scan the field-of-view at a rather high frequency and provide for storage prior to transmission. In such a case, the lines-of-view so scanned will greatly overlap so that there is significant redundancy in the scanning. The line signals so stored in the aircraft and representing overlapping strips may be combined to generate a lower frequency scan signal which is then transmitted. One can use here, for example parallel storage for n different lines, fast scanned sequentially, but available in parallel and in line synchronism for combining n image increments in parallel, to create one new element per circulation. A new line is thus assembled in frequency reduced operation, wherein the frequency reduction is given by the number of image elements per line; that can be the same number used in the assembly process explained with reference to store 22. The slow rate scanning signal is then transmitted and produced as described earlier.

A further simplification here is the following. The line scan signal does not have to be presented on a fine gray scale (requiring large bandwidth for transmission). Thus, preprocessing in 16 may include multiple thresholding in that the bright, dark and gray tones are represented only by a few fixed signal levels so that the signal as arriving at sample and hold 21 has only one of a few values. Using this technique for multicolor picture advantage of multicolor display can be taken, and still only a narrow bandwidth is needed for transmission.

Another modification is the following. The sensor 11 may scan at a relatively fast rate but only intermittently, and the line scan signals are transmitted with gaps. This way, one can for example use the same transmission band for signals from different sensors which are time multiplexed in this manner; lines are actually transmitted in immediate sequence, but sequential lines pertain to different sensors. In any event, any particular image is composed then of lines spaced apart i.e. there are (vertical) gaps. The missing lines can be simulated in that for example each line is actually inserted in the image store 25 several times, or missing lines are composed from line signals representing the lines above and below. The line compositioning may be carried out by computer or simply through algebraic signal mixing before insertion in the circulating store 25. The input gate 29 for store 25 is shown to have an alternative input to obtain such signal superpositioning in assembly store 25. For example, when a line has been completely assembled in store 22, the line which was the top line in store 25 is shifted down through phasing of the setting of the vertical sync markers and in addition it is readout and algebraically combined (at a reduced signal strength) with the assembled line in store 22 and that combination or averaged line is set into store 25 as the new second top line, followed by setting the line in store 22 as top line in frame assembly store 25. The line in store 22 is thus used twice. Such procedure is economical and reasonable when the scenery contains few contrast variations and changes, such as lakes, large forests or the like.

The alternative input for gate 29 can be used also to combine the signal from a different type scanner with the information as circulating in store 25. Also, video signals representing markers can be added here in particular phase relation i.e. to a particular line in particular instants.

Figure 4B:
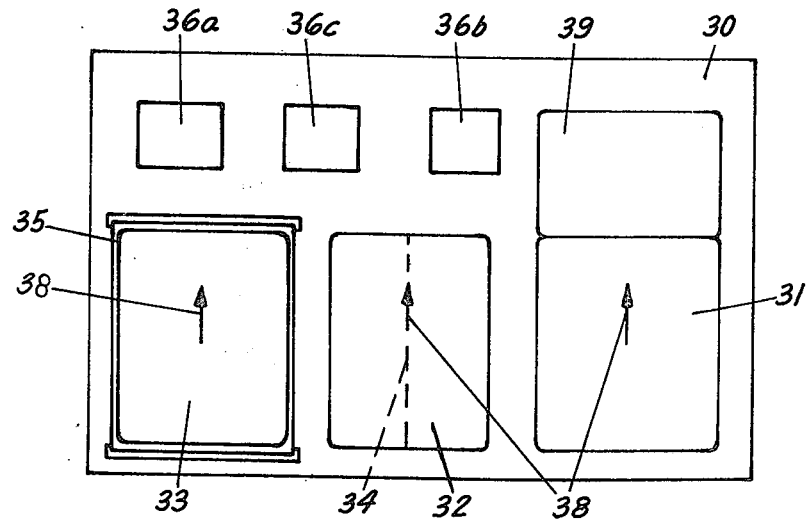
FIG. 4b is a somewhat schematic view of the image reproduction monitor used in the system of FIG. 3.

The video signal as extracted from store 25 is fed to the monitor 30. FIG. 4b shows by way of example a more detailed front panel of that monitor. The monitor may have three screens 31, 32, 33. Screen 31 may be the normal viewing screen for the observer, while screen 32 for example is a reproduction on a larger scale. The particular display for screen 32 will then use only some of the scanning line as transmitted and only a portion of each line, so as to obtain a picture on a larger scale; screen 33 provides the same reproduction as 31 or 32. These plural screens, however, may serve other uses.

Figure 1:
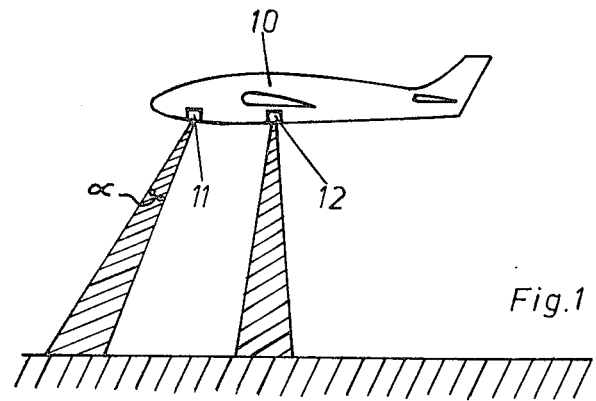
FIG. 1 shows schematically an aircraft as it scans the area and scenery over which it passes.

The system above has been explained with reference to one scanner and one signal train. However, the aircraft may have several scanners pointing in different directions, but always with line scans transverse to the direction of propagation of the aircraft. Thus, one screen may image the field-of-view as scanned by sensor 11, another one as seen by sensor 12 (FIG. 1). The same scene may be observed here, but delayed by the screen reproducing scanning of sensor 12. These several scan signals are processed separately, in separate channels, including particularly separate storage. In the essence, this amounts to duplication of the system shown in FIG. 4a. However, if the several scans run in synchronism with each other, then the timing and phasing circuits for the several stores can be shared. Transmission may occur on a multiplexing basis or through separate channels, depending on the available bandwidth. Also, different scans may originate with different type sensors each covering the same field-of-view and running also in synchronism as far as the line scan process is concerned. One sensor may be a video scanner, another one an infrared scanner, a third one a radar scanner. The three sensors 31, 32, 33 will then reproduce these differently produced images. Still alternatively the different scanners may produce different colors and in this case the different color information will be superimposed in one screen for multicolor viewing, while another one brings only the black and white signal. Returning for the moment to multiple scanning of the same field-of-view, one can for example combine and mix the reproduce signal of a black-and-white (or monochromatic) channel with the reproduce signal resulting from infrared scanning so as to obtain contrast enhancement in the picture as reproduced in one of the screens.

FIG. 4b shows markers such as 38. They may be affixed or superimposed in the display and represent the position of the craft over the passing screen. It will be recalled that the scanner 11 scans, for example, ahead of the craft and shortly thereafter the current scan will become the top line in the display. The craft has a particular position to that line as the scan rate has a particular relation to the speed of the craft if the scanning rate is controlled from the speed of the aircraft. Please note, that in the case of controlling the sensor scan rate in dependance upon the aircraft speed, then the rate of updating the reproduced picture by added lines on top is also dependant upon the speed, and the field-of-view as running through in the monitor display is proportionate to the aircraft speed. Thus, the craft will be always over the area scanned a fixed number of lines earlier. The standing marker 38 will, therefor, represent the relative movement of the craft over the scenery.

As schematically indicated with 36a, a control button on the panel may be used to stop and to arrest the picture as displayed. This may simply amount to a disabling of the gate for transferring any information from store 22 to store 25 and disabling further the circuit that relocates the vertical sync markers in store 25. The content of store 25 is, thus, displayed as a still picture. The monitor, in addition, may now include circuitry, known per se, which simply moves the imaged marker 38 in proportion to the aircraft speed as signalled otherwise from the craft to the ground station.

FIG. 4b furthermore shows a block 36b which can be interpreted as a push button panel or keyboard whose push buttons when pressed activate portions of a ROM storing signals which represent information to be superimposed upon the picture on one of the screens. This information may include numerical data such as speed or altitude or both of the craft. Also, symbols for particular objects such as trees, roads, lakes etc may be entered in particular coordinates to be superimposedly displayed.

Reference numeral 36c schematically denotes a device better explained more fully below pursuant to the description of FIG. 5. Generally speaking, the devices 36a, 36b and 36c of FIG. 4b may be included in the control board 61 of FIG. 5.

FIG. 4b shows further that another display screen 39 is associated with screen 31 and displaying a previously recorded perspective image of the scene which is ahead of the one currently displayed. The image on that screen 39 may be "rolled" also and is one way of providing a visible input to the operator for controlling the aircraft so as to maintain a previously charted course and speed.

Another way of control is depicted with reference to screen 33. Reference numeral 35 refers to a superimposed transparent photographic image of the same scenery now passed over by the craft. The photographic images here may be a roll of film with one continuous picture passing across the field-of-view at a particular speed representing the speed the aircraft is supposed to have. The visible comparison made possible through the superimposing input provides an input to the operator for controlling the aircraft in accordance with a prescribed path and speed as represented by the speed and content of the film as superimposed upon the display derived from the aircraft.

The central screen 32 depicts an additional or alternative way of providing for a visible comparison between actual and desired position of the craft. The line 34 is superimposed by and in the TV display and represents the projected course above the position indicator 38 and the actual course the plane took below the current position indicator 38.

By way of example as far as marking the course is concerned, the keyboard 36b may include a coordinate selector with visible marker displayed in superimposing relation upon the TV picture as reproduced. Such marker may be equivalent to 38 or smaller, limited e.g. to one line width in height. The coordinate selection may operate digitally on line number and image increment number along one display line, analogous to such numbers as tracked in counter 23a. Similar tracking may be provided in store 25. If the selected position number on the screen coincides with the image increment as recirculated in store 25, a bright marker may be superimposed and recorded. This way a visible course is plotted on the screen denoting the path the craft took over the area. The projected course may be the result of computer operation which provides for the coordinate values of position markers then visibly superimposed upon the display screen 32 (FIG. 5).

Conceivably, several different remote controlled aircraft are in the air, each being separately monitored.

It may be advisable here to cross-link information in that position indicators of one craft are displayed also on the screen of the other. Time sharing and multiplexing may be used here to use a single transmission channel.

Figure 5:
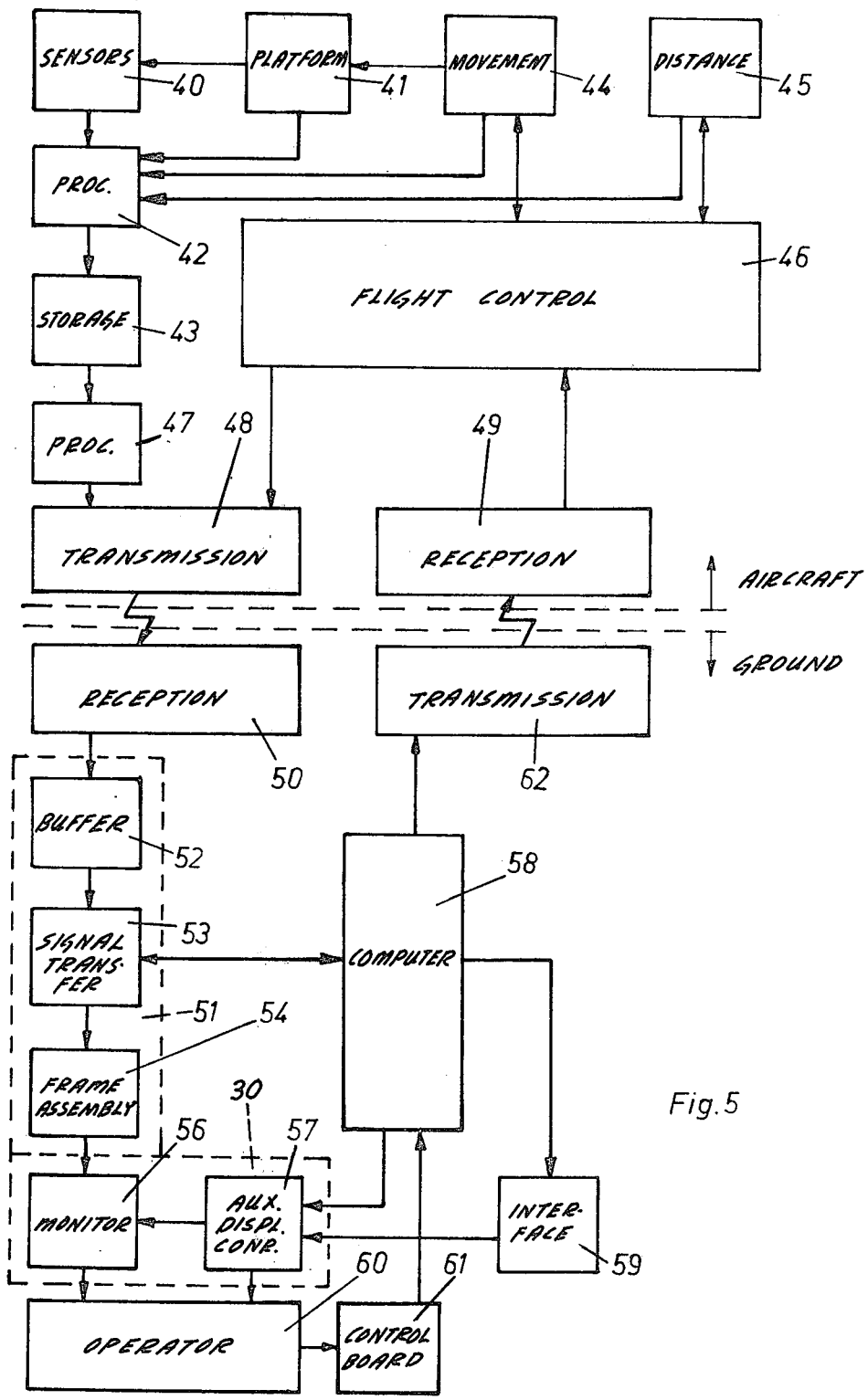
FIG. 5 is a more detailed block diagram of a complete system for practicing the invention.

Turning now to FIG. 5, the system shown therein represents basically the system as shown in FIG. 3 but to some extent the greater detail and supplemented by components representing the remote control of the craft as undertaken by an operator observing a monitor.

The onboard equipment includes a plurality of sensors 40 which include sensor 11 and arranged on a stabilizing platform 41. The purpose here is to provide for a definite position of the sensor for purposes of reference. The information is passed from sensors 40 to a stage 42 for compensating oscillations of the platform. Such compensation is not needed when the platform is, e.g. stabilized through gyromechanisms. Electric compensation if needed is carried out in stage 42 in response to a motion sensor 44 and a distance measuring device 45. These elements 44, 45 may be part of the telemetric equipment and are connected accordingly to flight controller 46.

The several sensor signals are stored in a unit 43 prior to transmission, to obtain for example time shared transmission over the same band by a transmitter 48. Generally speaking on-board store 43 may include fast sensor scan storage and conversation into a slow scan rate signal as outlined above. For example, the or one of the sensors may scan fast and stop. The sensor signal is stored and transmitted at a slow rate whereupon the fast scan is resumed.

The circuit here is similar to the one explained above with reference to FIG. 4a except that it works on an inverted basis. The fast circulating scan signal is sampled progressively at phase points determined by tracing counters analogous to counters 23a, b and comparator 24. The sampled signal is then used to modulate the transmission carrier with one such modulator signal available per circulation of the stored, one line scanning signal. The modulated carrier is then transmitted. A circuit in the ground station and as was explained with reference to FIG. 4a, provides for the reverse regeneration of a fast TV scan signal for frame assembly and presentation on TV.

One can see, that multiple sensor signals can be transmitted on that basis and on a multiplexing fashion, each sensor providing a fast scan followed by a hold of the scan while the acquired information is scan converted separately and multiplexed. One can see also, that in the case of a fast sensor scan and low rate transmission, speed dependancy of the scan be carried out differently. The sensor scan may be carried out at a constant high rate, but the intermittency i.e. the pause between scans is speed controlled. Since however the rate of the low rate sampling must then also be aircraft speed dependant, the high scanning rate may also be speed dependant to obtain synchronism between the storage and the sampling process on-board the aircraft.

The slow rate signal is passed through signal filtering and other analog preparation as indicated at 47. The transmitter 48 may include the modulation stage. The on-board equipment includes additionally the flight controller 46 and a receiver 49 for command signals.

FIG. 5 shows also symbolically and summarily the several features in the ground control station. The station has a receiving unit 50 which may be a multiple channel unit or a single channel with time-demultiplexing to obtain plural trains of sensor signals. Unit 50 may include plural receivers such as 18, combined with the necessary demodulation amplifier etc. stages such as 19, separately for each channel.

Reference numeral 51 denotes the storage unit for all information and includes store 20 for a single sensor channel. Basically, this storage facility 51 can be divided in prestorage 52 corresponding to unit 22 and frame assembly unit 54 corresponding to and including store 25. Reference numeral 53 denotes an information processing device generally, and may include here intermediate buffering, gating and timing control for phasing the transfer between prestorage and frame assembly. Unit 53 may further include combining stages to simulate missing lines in the case of intermittent transmission. Unit 53 may also provide for contrast enhancement.

The timing of transfer of each line including the insertion of a new line and the control of composing lines from others may be under control of a computer 58, including the generation of the processed vertical sync signal to obtain down shifting of the image lines at the rate of aircraft propagation etc. Assembly unit 54 may also include a particular store in which the frame of composite image is assembled from several sensor channels, e.g. a frame whose lines are composed of infrared and radar signals, and the assembly process may be under control of the computer as the sensor signals may not occur in exact synchronism as to each imaged point of the field-of-view.

Reference numeral 56 refers to the monitor proper including multiple display screens receiving information while stage 57 represents the display of additional information such as the display of prerecorded films of the same area. That display is under control of unit 59 such as a motor driving the roll of film. The unit 59 is likewise under control of the computer correlating a speed signal for the aircraft with the film motor speed that will represent the display of aircraft speed in that manner.

The block 60 represents the (human) operator of the system, and the arrows from blocks 56 and 47 represent the visible inputs to him. Reference numeral 61 refers to an input terminal for the computer 58 operated by the operator in response to the visible input. It may be assumed, that the panel of the terminal 61 is constructed to receive from the operator e.g. operating command signals for the aircraft for purposes of remote control in a manner known per se, using for example as control panel a flight deck simulator or the like.

The command signals as processed by the computer 58 are issued to a transmitter 62 which transmits them to the aircraft. The signals are received at 49 and fed to the aircraft control 46. The command signals may further include trigger signals for guns or the like in the aircraft.

In addition to issuing commands to the aircraft, the computer 58 provides corresponding signals to the display 57, 59 and its control so that the operator has a visible representation of the inputs including for example simulation of increased or decreased aircraft speed as it should result in the aircraft and that in turn can be visibly compared by operator with any changes in the reproduced picture or pictures as originating in the aircraft sensors.

The connection between stage 53 and computer 58 is shown as double arrow, indicating the possibility of information flow from stage 53 to the computer. This information flow may include stripped sync signals from the line for line presentation of sensor information by prestorage, so as to cause the computer to generate sync and transfer signals as need for the display and for the assembly of display information in stage 54; in other words the computer may take over the function of timing control 26 in FIG. 4a.

It should be noted here, that the information flow from unit 53 to the computer may include running information in digital form representing positions of line image increments on a time scale basis. Specifically, this signal train passing here defines e.g. digitally where the electron beam for the TV monitor is in any instant. The stored sync signal may be the source of that information. This then permits the computer to keep track exactly of the assembly and presentation of the image signal by and in unit 54. This way then it is possible also for the computer to control the position of insertion of superimposed markers, either as part of the image information as stored, processed etc. in unit 54, or in dependent superpositioning occurring right in the immediate monitor control.

As was mentioned above, the display panel (36b) may include coordinate selectors for superimposing markers or the like. This coordinate selector may be included in control panel 61 and the inputs here will be processed by the computer to control the insertion of signal representation into the monitor video reproduction for superimposing a marker in a selected position of the display. Insertion may include here an indication of the aircraft position which will be inserted into the frame assembly via stage 53. By way of example, the coordinate selector of 36b as included in control board 61 is used generally to select a particular coordinate point on the display. The computer compares the location of the reproduce beam of the TV monitor with that selector and issues and appropriate command. As outlined above, the command may result in the insertion of a recorded marker via the input gate for store 25 (FIG. 4b, 53 in FIG. 5). Alternatively the computer may issue the command to the monitor 56 via "additional information control 57" to provide a temporary superimpositioning of a visible marker. The selection may be made here also through the panel 61 as outlined above and may include selection of the type of information so included in the display. In a simple form, that may be a visible arrow whose point is the selected point. Since the position of the aircraft is fixed within the display, its coordinates are fixed parameters. Hence, the computer can calculate the location of the point pointed to by the arrow in relation to the aircraft. If the aircraft is a military aircraft, the operator may issue a command for the computer to calculate data by means of which a gun on the aircraft is moved in position and trained on the target so pointed to. These data are transmitted via link 62–49 to the aircraft and another command by the operator may fire the gun. By keeping the arrow trained on that target multiple action can be obtained. One can see here the purpose of multiple scanners such as 12 to provide for field-of-view pictures not only at different angles, but with later updating due to the different angle in forward direction. This later picture may reveal the result of the action taken.

Another situation is the following, already alluded to above. Reference numeral 36a was introduced above as a control button which stops image updating and, in effect, disables transfer from 53 to 54 so that the image as displayed is the one that was assembled in 54 (or 25). If the computer receives from the aircraft additional telemetric data as to its speed, altitude and coordinates, or if such data are generated on ground, the computer may calculate coordinate values in the scale of the display and control superpositioning of a marker representing the craft as it moves relative to the now stationary scenery, beginning with the location as defined by a marker 38 on one of the screens, permitting for example the operator to visibly follow the aircraft. If for example the store such as 25 is duplicated, each one controlling a separate screen, only one of the displays may be arrested to a still picture and a marker moves in representation of the aircraft, while the other image is updated as before, permitting direct comparison. This way, the craft may be for example landed, when the still display picture shows the land strip in its upper portion.

As was outlined above, lines of information may be simulated through interpolation and algebraic addition when, for example each new scanning line transmitted is not to be juxtaposed to the previous one, but when there is a gap, e.g. for reasons of time sharing of the same transmission channel to transmit lines from different sensors over the same sensor. In such a case the computer may be used to generate the missing lines and cause insertion in the respective gaps via unit 53 (see alternative signal input for gate 29 in FIG. 4a).

In addition, the entire information flow from prestorage 52 may pass into the computer e.g. for recording on a permanent basis on tape or disk, printout or otherwise so as to permit for example later display and evaluation for training purposes, intelligence evaluation etc.

The invention is not limited to the embodiments described above but all changes and modifications thereof not constituting departures from the spirit and scope of the invention are intended to be included.

We claim:

1. A system for reproducing an image of a particular field-of-view from a remote controlled vehicle, and along its travel path, comprising:

sensing means on the vehicle and provided for continuously line scanning the field of view, the lines running transversely to the direction of propagation of the vehicle, thereby providing a line scan signal of on a continuous basis, and representing the lines covering the field-of-view sequentially and continuously as the vehicle progresses the lines running transverse to the direction of propagation of the vehicle and without field scan transverse to the direction of the lines other than the movement of the vehicle transversely to the direction of the lines;

first means for transmitting the line scan signal to a station being stationary or moving independent from the vehicle;

second means for receiving said transmitted line scan signal at said station;

signal processing means including means (a) for storing said line scan signal as sequentially received with respect to sequential lines for assembling information of an image field in the sequence of line scanning, and as a plurality of lines, whereby each line as received for storage by the means (a) is stored in a particular position corresponding in the image field, said processing means further including means (b) for causing the stored signal to be shifted in the means (a) as to their respective line positions in the image field upon adding of the signals of each newly received line in the particular position, so as to obtain shifting of each line in the image field to different positions in the image field corresponding to the progression of the vehicle, each line remaining in the store until being dumped; each line as stored in means (a) is not being updated as to its content by scanning signals from the sensing means; and display means connected to the means for storing, and displaying on a screen the plurality of the lines as stored in the means (a) repeatedly and independently from the updating of the image in the means (a), but including each new scanning line and the lines as shifted by operation of the means (b), resulting in shifting of the display of the lines across the screen at a rate proportional to and representative of the speed of the vehicle, whereby each line as initially stored is displayed repeatedly but in different positions on the screen.

2. A system as in claim 1 and means for controlling the scanning rate of the sensor in dependance upon speed of the vehicle.

3. A system as in claim 1, and including a marker on the display screen, the image as displayed being oriented in relation to the marker so that the screen denotes the projected presence of the vehicle in the imaged field-of-view.

4. A system as in claim 1, wherein the means for storing has capacity for at least as many lines as there are lines in the displayed image, and for each new line being stored, one line is dumped from storage.

5. A system as in claim 1, wherein plural sensors are provided to provide for separate scan signals but covering at least in parts the same field-of-view;
    means including the first, second and signal processing means means, for transmitting, receiving and storing the separate scan signals; and
    means including the display means for providing images corresponding to said scan signals as stored.

6. A system as in claim 5, wherein the different sensors are responsive to different frequencies.

7. A system as in claim 6, wherein the different sensors include a radar sensor.

8. A system as in claim 6, wherein the different sensors include a infrared sensor.

9. A system as in claim 6 wherein the different sensors are color responsive.

10. A system as in claim 1, including means for displaying additional image information in relation to the displayed image and in independently controllable variation in relation thereto.

11. A system as in claim 1, wherein the line frequency of the line scanning is adjustable in accordance with the speed of the aircraft.

12. A system as in claim 1, including means for displaying additionally the projected travel path of the vehicle in superimposed relation to the displayed image.

13. A system as in claim 1, including means for providing additional information for visible superimposing upon the display of said screen.

14. In a system linking a remote controlled vehicle with its remote control stand via a transmission link, the improvement comprising:
    a sensor in the vehicle for providing a scan signal representative of scanning the scenery over which the vehicle passes, transverse to the direction of movement of the vehicle and at a line scan rate depending upon and varying with the speed of the vehicle;
    means for transmitting the line scan signal from the vehicle and for receiving it at the control stand via said transmission link;
    a first storage device connected to the means for receiving and for storing the line scan signal as received, individually as to each scanning line;
    a second storage device for assembling line signals in plural lines and in a format for presentation in a frame composed of plural lines as stored in the second means; first circuit means connected to the first and second storage device for controlling the transfer of signals from the first to the second storage device to obtain insertion of the signals as presenting a line as scanned, as top line in the frame;
    second circuit means connected for shifting the line scan signals of the lines within a frame down upon insertion of a new top line; and
    display means for providing a running display of the frame as stored in the second storage device.

15. In a system as in claim 14, wherein the sensor has a forward orientation so that the line as scanned is forward from the vehicle, the display providing for superimposed indication of the vehicle below the top line as displayed.

16. In a system as in claim 14, wherein the sensor provides a relative fast scan the transmission link including means for transmitting the line scan at a slower rate to obtain narrow band transmission.

17. A system for reproducing an image of a particular field of view from a remote controlled vehicle and along its travel path comprising:
    sensing means on the vehicle and scanning the field of view by line scanning without field scanning, the lines running transversely to the travel path, field scanning being indirectly provided by movement of the vehicle along the travel path;
    first means connected to the sensing means and assembling sequentially line scan signals for display;
    second means connected to the first means for receiving each of the assembled line scan signals at a rate corresponding to the assembly, for storing said line signals as received in sequential line positions for storage and for subsequent display, the second means being connected for receiving each new line scan signal as assembled, in a particular position;
    third means connected for shifting the storage position of each line as initially received and stored, to a position away from the particular position, corresponding to a shifting of the entire image transversely to the lines;
    fourth means connected to the second means for displaying the line signals as image on a display screen, whereby each line as stored is repeatedly displayed, but in different positions due to shifting by operation of the third means, so that the image moves across the display screen; and
    at least the second, third and fourth means being disposed remotely from the vehicle, the system including a transmission link from the vehicle to the second means as far as the connection between the sensing means, the first means and the second means is concerned.

* * * * *